United States Patent [19]

Klamm et al.

[11] Patent Number: 4,756,510

[45] Date of Patent: Jul. 12, 1988

[54] METHOD AND SYSTEM FOR INSTALLING FIBER OPTIC CABLE AND THE LIKE IN FLUID TRANSMISSION PIPELINES

[75] Inventors: Kenneth G. Klamm; Margaret A. Yaege, both of Independence, Kans.

[73] Assignee: Atlantic Richfield Company, Los Angeles, Calif.

[21] Appl. No.: 895,615

[22] Filed: Aug. 11, 1986

[51] Int. Cl.$^4$ .............................................. B65H 59/00
[52] U.S. Cl. .................... 254/134.4; 405/154
[58] Field of Search ............. 405/154, 184, 171, 155, 405/156; 15/104.03, 104.05; 254/134.3 FT, 134.3 R, 134.4; 138/94, 97

[56] References Cited

U.S. PATENT DOCUMENTS

| | | | |
|---|---|---|---|
| 1,620,788 | 3/1927 | Thompson et al. | 254/134.4 |
| 2,980,399 | 4/1961 | Littlefield | 254/134.4 |
| 3,401,749 | 9/1968 | Daniel | 405/184 X |
| 3,467,196 | 9/1969 | Kinsman | 405/184 X |
| 3,495,546 | 2/1970 | Brown et al. | 254/134.4 X |
| 3,793,732 | 2/1974 | Hamrick | 254/134.4 X |
| 4,030,702 | 6/1977 | Ware et al. | 254/134.4 |
| 4,185,809 | 1/1980 | Jonnes | 254/134.4 |
| 4,498,659 | 2/1985 | Brockelsby | 254/134.4 |
| 4,648,744 | 3/1987 | Knapp | 405/184 X |

FOREIGN PATENT DOCUMENTS 2151414  7/1985  United Kingdom ......... 254/134.3 R

Primary Examiner—David H. Corbin
Attorney, Agent, or Firm—Michael E. Martin

[57] ABSTRACT

Fiber optic cables and similar signal conductors are installed in fluid transmission pipelines by cutting the pipeline at spaced apart points to form a section of pipeline for receiving the cable, installing pipeline pig launching and receiving fittings on the section of pipeline to receive the cable, and pumping a pipeline pig from the launching fitting to the receiving fitting while connected to one end of the cable by pumping liquid or gas into the pipeline behind the pig. Pressure responsive seals are provided for engagement with the cable at the launching fitting to prevent leakage of pumped fluid from the pipeline section into which the cable is being installed. The seals may be used to seal cable entry and exit points on inactive pipelines. Active pipelines are restored to service by the installation of a cable seal assembly having a split stuffing box and packing gland arrangement for sealing the entry and exit point of the cable with respect to the pipeline.

11 Claims, 3 Drawing Sheets

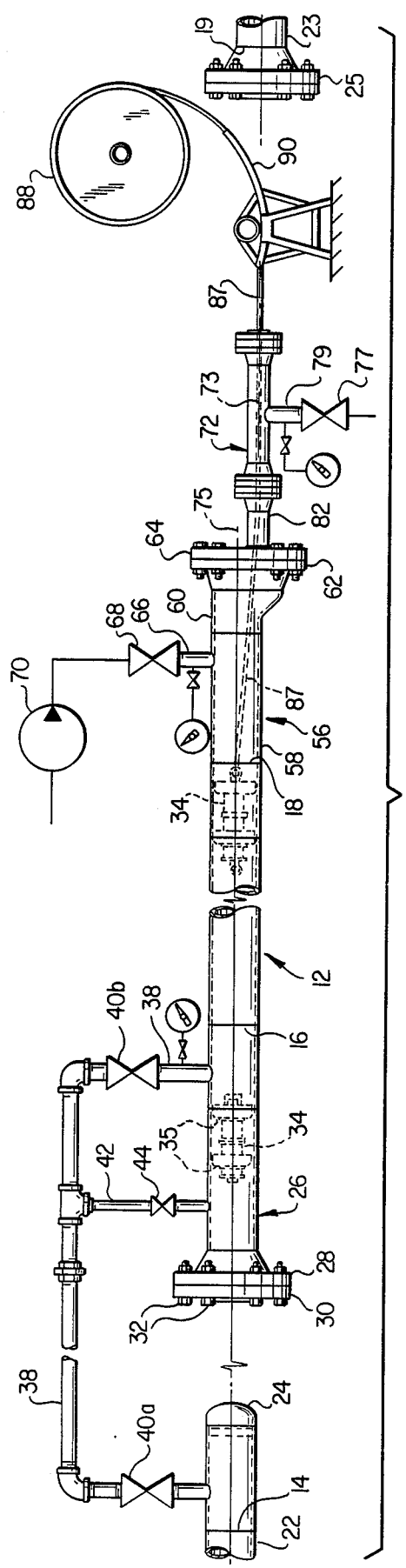
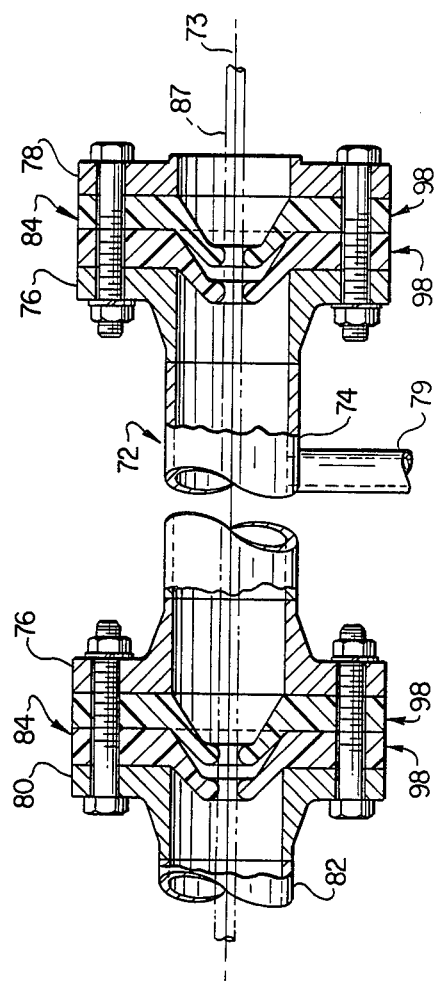
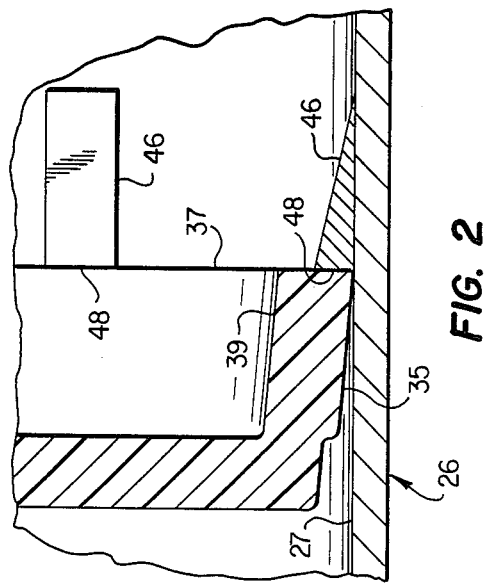
FIG. 1
FIG. 3
FIG. 2

METHOD AND SYSTEM FOR INSTALLING FIBER OPTIC CABLE AND THE LIKE IN FLUID TRANSMISSION PIPELINES

BACKGROUND OF THE INVENTION

1. Field of the Invention

The present invention pertains to a method and system for installing fiber optic cables and similar signal conductors in fluid transmission pipelines including the process of towing the cable or a pilot wire through a pipeline system by a pipeline pig from a launching point to a receiving point provided in the pipeline.

2. Background

The development of long distance transmission of communication signals by fiber optic cables has taken into consideration the support structure and surroundings of these cables. The low energy level required and speed afforded by the transmission of communications by fiber optic cables makes the use of such cables attractive and existing rights of way such as railroad and pipeline systems are attractive as a right of way for fiber optic cable systems.

The extensive network of fluid transmission pipelines already in existence in the United States and other countries for the transportation of crude oil, refined petroleum liquids and other hydrocarbon fluids is particularly advantageous with respect to the use of both active and inactive pipelines for receiving fiber optic cables and the like. Fluid transmission pipelines Care particularly attractive for use in conjunction with stringing fiber optic cables since the pipeline normally extends along a direct route between major points of sending and receiving communication signals and provides unique protection for the cables themselves. Moreover, the extensive network of pipelines already in existence minimizes the effort required in acquiring right of way for installation of the cable. It is in regard to these advantages of using fluid transmission pipelines for extending fiber optic cables and similar signal conductors between receiving and sending points that the present invention has been developed with a view to providing unique methods and a system for the installation of fiber optic cables in both active and inactive fluid transmission pipelines.

SUMMARY OF THE INVENTION

The present invention provides a method for installing fiber optic cables and similar flexible signal conductors in existing active and inactive fluid transmission pipelines including the steps of towing the cable by one end thereof through a predetermined length of pipeline using a pipeline pig and pumping the pig through the pipeline with pressure fluid.

In accordance with one aspect of the present invention, fiber optic cable is installed in a fluid transmission pipeline section by inserting a pipeline pig or the like into the pipeline section at one end thereof and connected to one end of a fiber optic cable or pilot wire which is inserted into the interior of the pipeline through a unique fluid seal. The pig, connected to one end of the cable or pilot wire for towing purposes, is pumped through the predetermined section of line, preferably by a liquid such as water, to provide a relatively smooth traversal and is retrieved at the receiving end of the predetermined line section wherein the cable is disconnected from the pig and terminated at a suitable connector exterior of the line or connected to a further section of cable for extension through an additional section or sections of pipeline.

In accordance with further aspects of the present invention, a unique launching and receiving system is provided for launching the pig from one end of the preselected section of pipeline and recovering the pig at the opposite end using special launching and receiving sections. A unique arrangement of a fluid seal is provided to minimize pollution of the environment exterior of the pipeline with pipeline fluids. In this regard, a unique cable seal is provided whereby the cable may be towed from a point exterior of the pipeline through the seal and into the pipeline interior with minimum risk of leakage of contaminating fluids from the interior of the pipeline to the environment around the pipeline itself.

In accordance with yet another aspect of the present invention there are provided unique pipeline fittings for use in installing a fiber optic cable within the pipeline, including fittings for use in launching a towed cable at one end of a selected section of pipeline and fittings for receiving the towed cable at the opposite end of the section of pipeline. The fittings and other features of the cable installation system and particularly adapted to prevent or minimize the chance of spillage of pipeline fluids at the points where the pipeline has been cut or opened to launch and receive the towed cable.

In accordance with yet a further aspect of the present invention, the unique cable seal provided for sealing the fiber optic cable both during towing or installation procedures may be used as a permanent seal, particularly in inactive pipelines. The present invention still further contemplates the provision of a unique sealing arrangement for sealing the point of exit or entrance of a fiber optic cable with respect to an active fluid transmission pipeline.

The above described objects and advantages of the present invention, as well as other superior features thereof, will be further appreciated by those skilled in the art upon reading the detailed description which follows in conjunction with the drawing.

BRIEF DESCRIPTION OF THE DRAWING

FIG. 1 is a side elevation, in somewhat schematic form, of a section of fluid transmission pipeline which has been cut at respective points to provide for the installation of a fiber optic cable in accordance with the present invention;

FIG. 2 is a detail section view of one of the installation fittings showing details of the pipeline pig restraining lugs on the pig receiving end of the pipe section in which a cable is to be installed;

FIG. 3 is a detail section view of a fitting to prevent the leakage of pig pumping fluid from the pipeline during installation of a cable;

DESCRIPTION OF THE PREFERRED EMBODIMENTS

Figure 4:
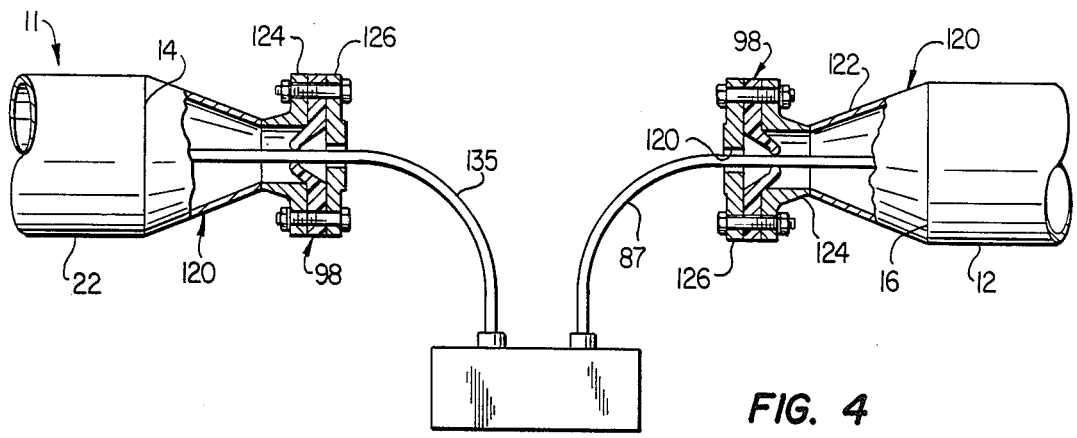
FIG. 4 is a view showing a completed installation of a fiber optic cable in an inactive pipeline.

In the description which follows, like parts are marked throughout the specification and drawing with the same reference numerals, respectively. The drawing figures are not necessarily to scale and certain elements which are conventional in construction and commercially available may be shown in somewhat schematic form or referenced only in general terms.

Referring to FIG. 1 there is shown a side elevation of a portion of fluid transmission pipeline 11 which has been temporarily cut to form a section 12. The pipeline section 12 is interposed between pumping stations, not shown, and, depending on the location of the line either above ground or underground, certain components which are shown in FIG. 1 may be required to be reoriented with respect to the horizon. For example, if the pipeline section 12 is disposed in a trench or other confined area it may be necessary to reorient some of the piping and fittings associated with the line and to be described further herein.

In accordance with the invention, it is contemplated that the pipeline section 12 is formed by cutting the pipeline at certain points which, in accordance with present practice in the formation of fiber optic cables, may be at intervals of approximately four miles considering the commercially available length of cables presently available. The pipeline 11 is thus cut at points 14, 16, 18 and 19 to form the section 12 and to accommodate the cable installation apparatus to be described herein. Alternatively, the points 16 and 18 may be at or near the ends of the pipeline 11 or at openings in conventional pipeline scraper traps, for example. A pipeline portion 22 shown in FIG. 1 may be considered the downstream end of the pipeline and the portion upstream of the section 12 indicated by numeral 23. For the sake of discussion herein it may be presumed that the aforementioned upstream pipeline portion 23 has already been worked on to install a length of fiber optic cable in accordance with the present invention. The upstream pipeline portion or section 23 is temporarily closed by a flanged closure fitting 25 welded to the section 23 at 19. Other types of temporary closure fittings may also be used in place of the fitting 25.

In accordance with one aspect of the present invention, the pipeline 11 is cut at points 14 and 16 to form the portion 22 and partially form the section 12. The portion 22 may be suitably closed temporarily by the installation of a closure cap member 24 welded to the pipeline portion 22 at 14 or also by using a temporary closure fitting commercially available. In like manner, a receiving fitting 26 is installed on the section 12 by welding the receiving fitting to the section 12 at 16. The fitting 26 comprises an elongated cylindrical section of pipe of the same diameter as the pipeline 11 and having a closure at its downstream end formed by a first flange 28 and a second flange 30 which is removably bolted to the first flange 28 by a series of conventional bolts 32. The receiving fitting 26 is adapted to receive a conventional pipeline pig 34 shown in a position wherein it has traversed the pipeline section 12 to pull a fiber optic cable or pilot wire therethrough. The pig 34 may be of a conventional design such as a type commerically available from T. D. Williamson, Inc. of Tulsa, Okla., and comprising their model SBN-4A. The pig 34 is typically characterized by spaced apart flexible cylindrical collar or cuplike seals 35 which are urged radially outwardly into engagement with the inner surface of the pipeline section 12 so that the pumping of fluid through the line will urge the pig 34 to traverse the line.

A fluid bypass conduit 38 opens into the pipeline section 12 through the fitting 26 and is suitably connected to the pipeline section 22 through the end cap member 24 or a suitable commercially available fitting, not shown. Conventional shut-off valves 40a and 40b may be interposed in the bypass conduit 38. A second bypass conduit 42 is spaced downstream from the bypass conduit 38 at its point of intersection and communication with the receiving fitting 26 and is provided with a conventional shut-off valve 44. As a pig 34 traverses the pipeline section 12 and approaches the fitting 26, fluid trapped in the pipeline section 12 ahead of the pig 34 may be bled off from the pipeline section 12 through the bypass conduits 42 and 38 and into the pipeline section 22. Alternatively, the bypass conduits 38 and 42 may be placed in communication with another vessel or pipeline section for receiving fluid displaced from the pipeline section 12 as the pig 34 approaches the flange 30. Once the pig 34 is in the position shown, between the respective points of intersection of the bypass conduits 38 and 42 with the receiving fitting 26, fluid in the pipeline section 12 behind or to the right of the pig 34, viewing FIG. 1, may be further displaced from the pipeline section 12 so that upon opening the pipeline section 12 to remove the pig 34 a substantial amoiunt of fluid will not drain from the pipeline section in an uncontrolled manner.

Referring briefly to FIG. 2, there is illustrated a detail showing the provision of a plurality of pig restraining lugs 46 which are preferably somewhat wedge shaped and include a transverse surface 48. The lugs 46 are preferably equally spaced around the inner wall surface 27 of the receiving fitting 26 and are operably to engage a transverse surface 37 on the upstream or trailing seal 35 of the pig 34 to prevent the pig from moving back upstream in the pipeline section 12 after it has passed the point of intersection of the bypass conduit 38 with the receiving fitting 26. As the pig 34 approaches the restraining lugs 46, the circumferential lip 39 of the seal 35 flexes radially inwardly to ride over the lugs and then assumes its normal position in engagement with wall surface 27 so that upon any tendency for the pig 34 to move in the opposite direction, such as under the urging of pressure fluid or tension in the cable being pulled by the pig, the lugs 46 will prevent movement of the pig in the direction opposite to that which resulted in installation of the cable within the pipeline section 12.

Referring further to FIG. 1, prior to installation of a fiber optic cable within the pipeline section 12, a launching fitting 56 is preferably installed on the pipeline section such as using a suitable clamp on coupling, not shown, or by temporarily welding the fitting 56 to the pipeline section at 18. The fitting 56 includes a length of cylindrical pipe 58 of the same diameter as the pipeline section 12, an eccentric reducing part 60 and a bolt type flange assembly comprising opposed flanges 62 and 64 which may be separated one from the other to provide an opening for installing the pig 34 in the pipeline section 12 through the launching fitting. The pig 34 is shown in an alternate position in FIG. 1 adjacent to the launching fitting 56 after installation into the pipeline section 12 through the fitting. The launching fitting 56 also includes a fluid inlet conduit 66 which is provided with a suitable shut-off valve 68 and is adapted to be connected to a source of pressure fluid including pump means 70.

In order to prevent loss of pressure fluid from the launching fitting 56, the flange 64 is connected to a cable seal fitting, generally designated by the numeral 72. Referring also to FIG. 3, the cable seal fitting 72 includes a length of cylindrical pipe or tubing 74 having opposed end flanges 76 and removable flanges 78 and 80. The flange 80 is suitably fixed to the flange 64 by a short section of conduit 82. Sandwiched between the respective sets of flanges 76 and 78 and flanges 76 and 80 are primary and secondary cable seal assemblies, each generally designated by the numeral 84. The seal assemblies 84 will be described in further detail herein. Leakage from the primary or inboard seal assembly 84, if any, may be detected by opening a valve 77, FIG. 1, interposed in a branch conduit 79 connected to the seal fitting 72.

Fiber optic cable 87 is inserted into the pipeline section 12 from a suitable reel 88, FIG. 1, and is dereeled therefrom and along a suitable cable guide 90 mounted adjacent the cable seal fitting 72 in such a way as to preferably align the cable 87 with the openings in the seal assemblies 84. The cable 87 typically comprises a series of elongated optical fibers which are clad and jacketed and contained within an outer jacket or sheath, preferably covered by or formed of a suitable plastic material. The diameter of cable 87 may typically be about 0.50 inches, although other sizes are operable in accordance with this invention, and the cable is preferably secured to one end of the pig by a conventional fitting, not shown in detail.

As illustrated in FIG. 1, the reducing part 60 may be an eccentric type so that the centerline 73 of the seal fitting 72 is slightly eccentric with respect to the centerline 75 of the pipeline section 12 to thereby position the cable during installation so that it will tend to lie on the bottom of the pipeline section 12 after installation. In this way, the cable 87 may installed in active pipelines which are subsequently traversed by pipeline pigs and other devices which are normally traversed through active fluid transmission pipelines. Since the pipeline 11 may range anywhere from 4.0 inches to 48.0 inches in diameter, the presence of a cylindrical cross section cable within the pipeline and of a diameter of no more than 0.50 inches to 1.0 inches will not significantly impede the flow of fluid through the line or impede the traversal of certain devices such as pipeline pigs through the line from time to time.

In carrying out a preferred method for installing a section of fiber optic cable 87 in the pipeline 11, the pipeline section 12 would be formed after evacuation of fluid from the pipeline 11 by placing suitable plug means, not shown, in the pipeline and downstream or to the left, viewing FIG. 1, in the section 22 and upstream of the section 12 such as in the section 23. Suitable plug means might include a freeze plug or a flexible inflatable bag inserted in the respective sections of line, both techniques being commercially known and used. After cutting the pipeline 11 to form the section 12 the fittings 24, 25, 26 and 56 are installed as illustrated. As previously indicated, the fittings 24, 26, 56 and 25 may be adapted to be connected to the ends of the respective pipeline sections by conventional temporary connectors such as a type manufactured by The Pipeline Development Company of Cleveland, Ohio. The flange 64, together with the seal fitting 72, would not be attached to the launching fitting 56 until the pig 34 was loaded into the launching fitting and the lead end of the cable 87 or a pilot wire or cable attached to the pig in a conventional manner. Prior to attaching the end of the cable 87 to the pig 34, the cable would be threaded through the seal fitting 72 by insertion through the respective upstream and downstream seal assemblies 84 and extension of the cable from the end of the conduit section 82 for attachment to the pig 34.

The pig 34 is normally moved past the conduit 66 so that fluid pumped into the fitting 56 from the conduit 66 can act to propel the pig through the pipeline section 12. The flange 64 is then coupled to the flange 62 and the pump 70 operated to fill the launching fitting behind the pig 34 to commence displacement of the pig to the left, viewing FIG. 1. The valves 40 and 44 are opened to displace air or any fluid remaining in the pipeline section 12, as well as any fluid leaking past the pig 34 from the section 12 into the line section 22 or, if section 22 of the line was blocked, the conduit 38 could be connected to some other receiving vessel, not shown.

It has been determined that the pig 34 may be traversed through the pipeline section 12, for example, using compressed gas such as air or nitrogen, although movement of the pig 34 is somewhat adversely affected by friction forces acting thereon when pumping the pig with compressed gas as opposed to displacing the pig through the line with a liquid, such as water. As the pig 34 reaches the position illustrated in FIG. 1 within the receiving fitting 26, the valve 4 should be checked to be sure it is open to reduce any tendency for fluid pressure buildup in the receiving fitting downstream of the intersection of the conduit 38 therewith. Once the pig 34 has progressed to the position illustrated within the receiving fitting 26 it is prevented from moving in the opposite direction through the pipeline section 12 by the restraining lugs 46. Pressure in the pipeline section 12 may then be relieved by the bypass of fluid through the bypass conduit 38. The flange 30 should not be removed until release of fluid pressure in pipeline section 12 upstream of the pig 34 and between the pig 34 and the flange 30. Thanks to the unique cable seal assemblies 84, negligible leakage of fluid into the seal fitting 72 or into the environment would be realized during the aforementioned cable stringing or installation operation.

Upon removal of the flange 30 from the receiving fitting 26, the pig 34 may be withdrawn and disconnected from the end of the cable 87 which it has pulled through the pipeline section 12. The receiving fitting 26 may then be removed from the pipeline section 12 and replaced by a suitable section to be described further herein depending on whether or not the pipeline is to remain as an active fluid transmission pipeline or as an inactive conduit. In like manner, the trailing end of the cable 87 extending from the launching fitting 56 would receive similar treatment upon removal of the launching fitting from the pipeline section 12 and replacement thereof by a suitable fitting, depending on the active or inactive status of the pipeline 11.

Figure 8:
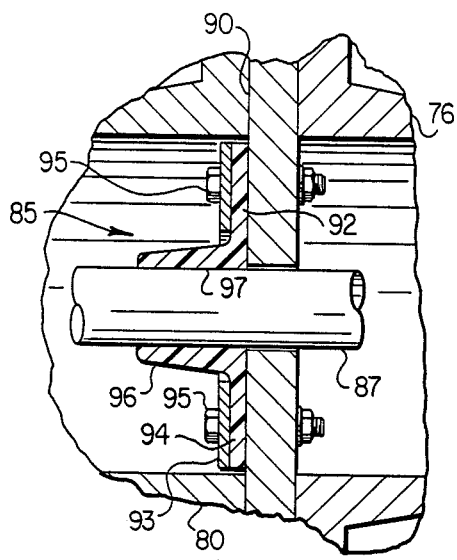
FIG. 8 is a central section view of an improved seal used for sealing a fiber optic cable in accordance with the present invention.

Referring now to FIG. 8, one embodiment of the cable seal assembly 84 for use with the seal fitting 72 and also for use with the cable installation in an inactive pipeline comprises a seal generally designated by the numeral 85. The seal 85 includes a generally rigid cylindrical flange piece 90 having a central bore 91 and to which a resilient seal member 92 is secured. The seal member 92 includes a cylindrical flange portion 94 and a hub or lip portion 96. The seal member 92 is preferably secured to the flange 90 by a reinforcing collar 93 and suitable threaded fasteners 95. The lip portion 96 is subject to fluid pressure within the interior of the pipeline section 12 or pressure within the interior of the launching fitting 56 to bias the lip portion radially inwardly into forcible engagement with the cable 87. In this way the seal member 85 is responsive to fluid pressure within the pipeline which, if increasing, increases the force with which the seal lip portion 96 forcibly engages the surface of the cable 87 to prevent the escape of fluid. A bore 97, formed in the lip portion 96 receives the cable 87 and is dimensioned to provide for engagement of the cable by the lip portion 96. A relatively lengthy sealing surface is formed by the lip portion 96 for engagement with the exterior surface of the cable 87. The resilient seal member 92 is preferably formed of a flexible nonmetallic material, such as molded polyurethane.

Figure 9:
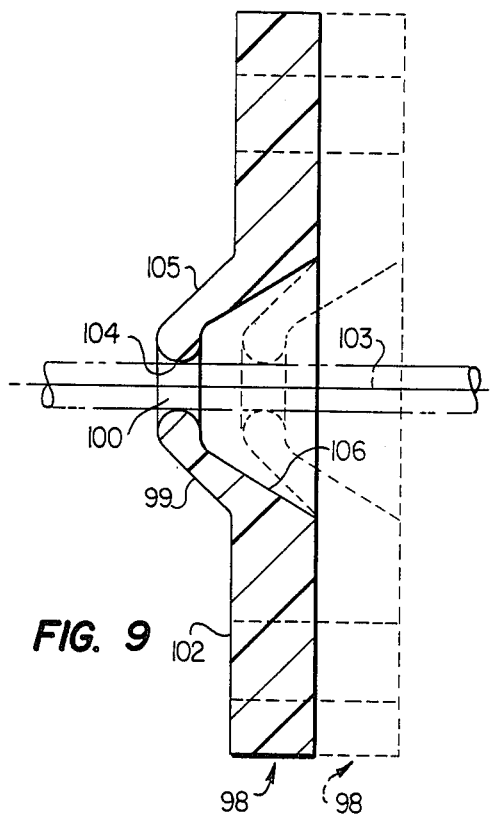
FIG. 9 is a central section view of an alternate embodiment of a cable seal.

Another embodiment of a resilient seal member which may be used in place of the seal 85 is illustrated in FIG. 9 in transverse section and is also the embodiment shown in FIG. 3. The seal member illustrated in FIG. 9 is generally designated by the numeral 98 and comprises a generally cylindrical plate-like member having a somewhat frustoconical hub portion 99 extending radially inwardly to define an opening 100. The hub portion 99 is integral with a cylindrical flange portion 102 and is delimited at its radially innermost end with respect to a central axia 103 by a somewhat circular surface 104 which minimizes the surface contact area of engagement with a cable 87 extending through the opening 100 while forming a seal at the radially innermost point of the surface 104. Fluid pressure may act on the surface 105 to force the surface 104 into engagement with a cable 87. In response to fluid pressure within the launching fitting 56, for example, or the interior of a pipeline section, the seal 98 remains in ever tighter gripping engagement with a cable extending through the opening 100. The somewhat conical shaped recess 106 formed by the configuration of the seal hub portion 99 permits axial stacking of seal members as indicated by a second seal member 98 shown in phantom in FIG. 9. An arrangement of a double set of seal members 98 is illustrated in FIG. 3 with respect to the seal fitting 72 for use when operating pressures exceed about 150 psig.

The installation of fiber optic cables between signal transmitting and receiving stations and over relatively long distances typically requires some form of connection between finite lengths of cable as a result of providing cable in specified lengths which are easy to handle or as a result of the need to provide signal amplification at specified points between terminals which may be several miles apart, for example. Referring to FIG. 4, there is illustrated a preferred arrangement for completing the installation of the fiber optic cable 87 at one end of the pipeline section 12 if the pipeline 11 is an inactive or nonfluid transmitting line. After removal of the receiving fitting 26 from the section 12 at joint 16, a commercially available enlarger fitting 120 may be installed comprising a short conical or cylindrical pipe section 122 and a weldneck flange 124. A seal 98 is preferably installed at the terminal fitting 120 in the arrangement illustrated in FIG. 4 and secured to the flange 124 by a blind flange 126 having a central opening 128 of sufficient diameter to permit exit of the cable 87. The cable 87 is terminated in a terminal vault 130 which may include a signal amplifier, not shown, or a suitable connector for connecting the cable 87 to a second section of cable 135 which enters the pipeline section 22, for example, through a second terminal fitting 120 also provided with a seal member 98 secured between flanges 124 and 126. The pipeline sections through which the cables 87 and 135 extend may then be pressurized with an inert gas to seal the interior of the pipeline sections to prevent entry of dirt and moisture. The cable termination arrangements illustrated in FIGS. 4 and 5 may be provided between the pipeline sections 12 and 23 also.

Figure 5:
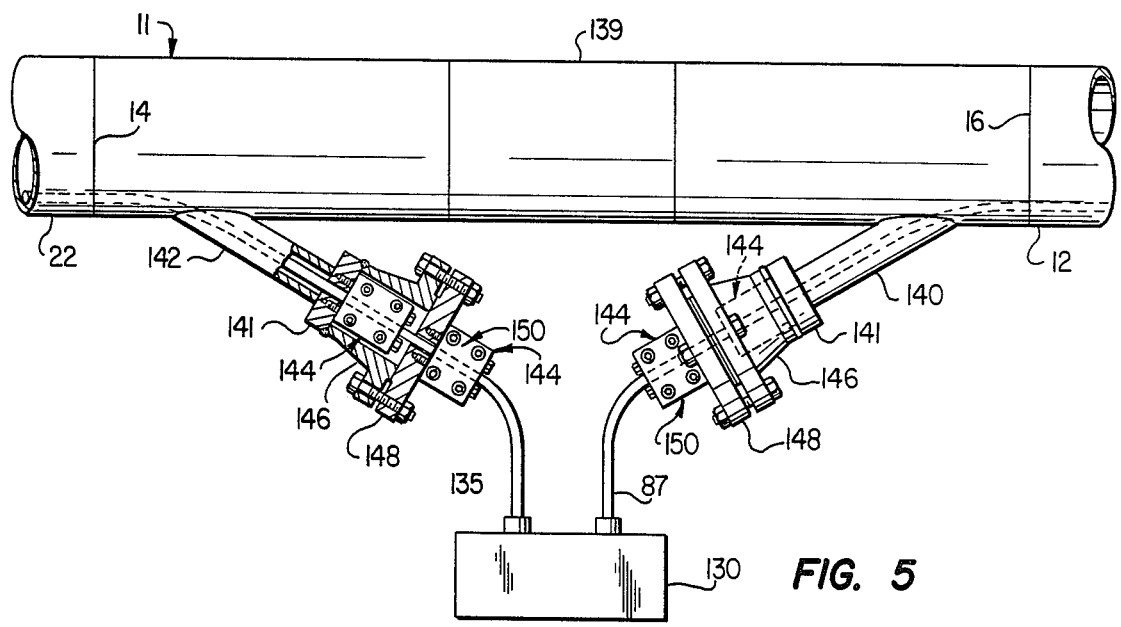
FIG. 5 is a detail view showing a completed installation of cable in an active pipeline.

Referring now to FIG. 5, there is illustrated a preferred arrangement for providing exit and re-entry of cable sections 87 and 135 with respect to the pipeline 11 if the pipeline is to remain active as a fluid transmission line. Prior to replacement of the pipeline 11 in service for transmitting fluid therethrough, a connection would be formed between the pipeline section 12 and the section 22, for example, by removing the receiving fitting 26 and the endcap 24 and welding a cable terminal fitting comprising a three piece section of pipeline in place between the pipeline sections 12 and 22 and which includes a central cylindrical section 139 which is welded at assembly to respective opposed pipe sections having laterally projecting cable exit or re-entry conduit portions 140 and 142. A similar cable terminal fitting would also be used to replace the launching fitting 56 and the fitting 25 or a second receiving fitting 26 previously put in place at the upstream end of the pipeline section 12 and the downstream end of the pipeline section 23. The conduits 140 and 142 are each provided with support means for series arranged seal assemblies 144. The seal assembly support means comprise support plates 141 secured to the respective conduits 140 and 142 and to respective weldneck pipe flanges 146 which are each adapted to be connected to circular flanges 148. The flanges 148 also support respective seal assemblies 144.

Figure 6:
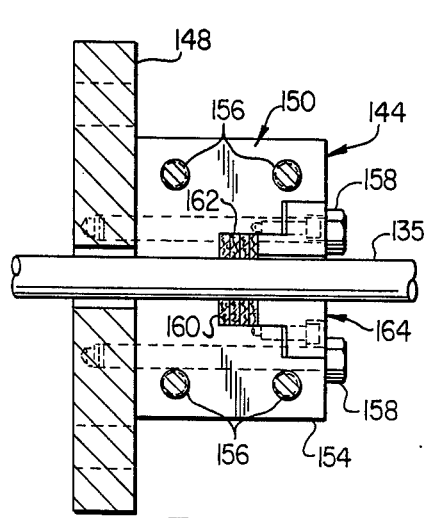
FIG. 6 is a view taken along line 6—6 of FIG. 7 showing a split housing and seal assembly for sealing the exit or entry point of a cable in an active pipeline.
Figure 7:
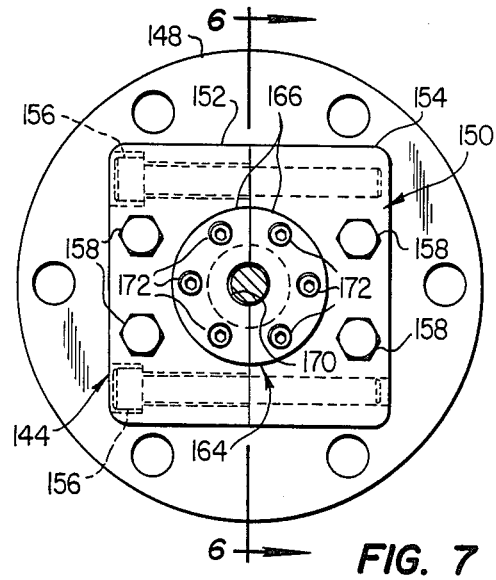
FIG. 7 is an end view of the seal assembly illustrated in FIG. 6.

Referring now to FIGS. 6 and 7, by way of example, the flanges 148 are each adapted to support the unique split housing type packing or seal assembly 144 for sealing the points of entry and exit of the cable sections 87 and 135, for example, to prevent leakage of fluid from or into the interior of the pipeline 11 through the lateral conduits 140 and 142. As illustrated in FIGS. 6 and 7, the improved seal assembly includes a generally rectangular housing or stuffing box 150 having opposed similar parts 152 and 154 which may be secured together by a plurality of threaded fasteners 156. The housing part 152 is suitably counterbored to receive the socket head type fasteners 156. The housing parts 152 and 154 are also bored to receive fasteners 158 for securing the housing parts to the flange 148. In assembly with each other, the housing parts 152 and 154 form a stepped or counterbored recess (160), FIG. 6, for receiving a suitable flexible packing 162 of a type commercially available which is retained in the recess 160 by a removable, cylindrical, split packing gland 164. The packing gland 164 includes opposed, generally cylindrical gland sections 166 which, in assembly, form a bore 170, FIG. 7, for extension of a cable section such as the cable section 135 therethrough. The packing gland sections 166 are retained in assembly with the stuffing box 150 by suitable threaded fasteners 172. Pressure on the packing 162 may be adjusted by adjusting the engaging force between the fasteners 172 and the split packing gland 164.

With the cable seal arrangement illustrated in FIGS. 6 and 7 the packing 162 may be replaced and the entire stuffing box may be assembled or disassembled with respect to the support plates 141 and the flanges 148 without disconnecting a cable section such as the cable sections 87 or 135 from the vault 130.

Figure 10:
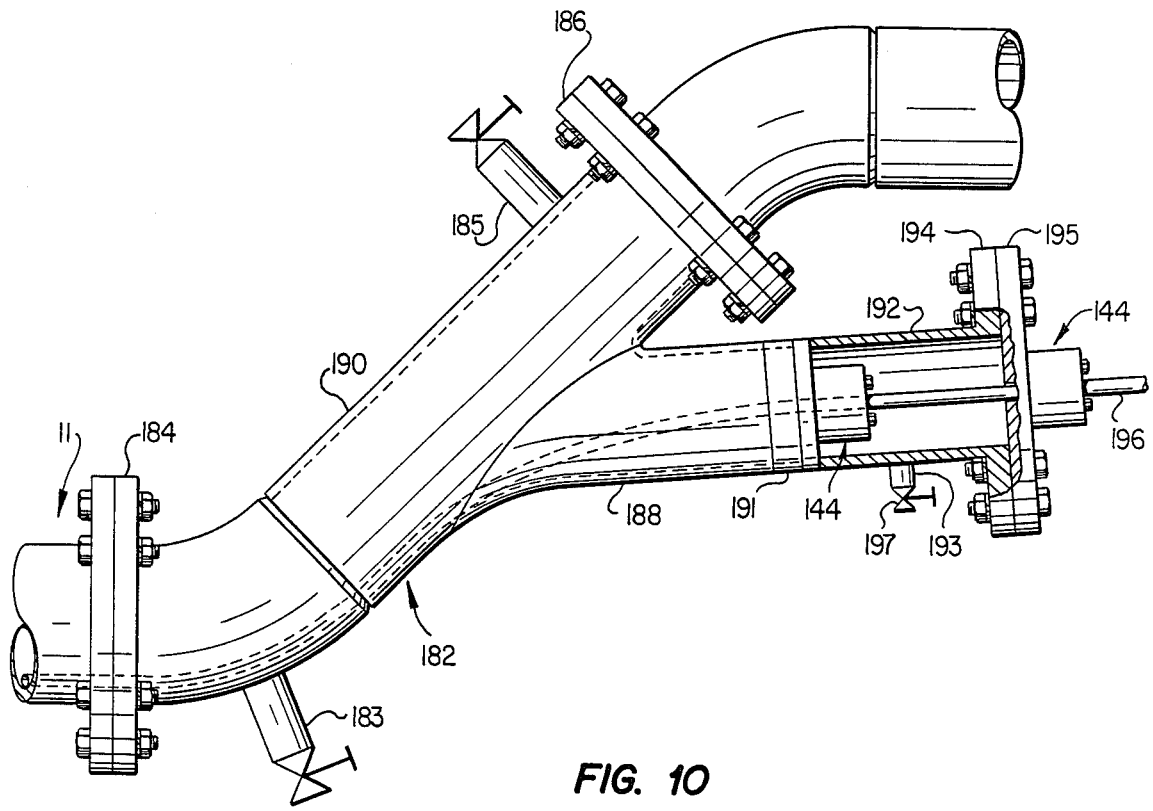
FIG. 10 is a plan view of an alternate embodiment of a launching and receiving fitting for a pipe section in which a fiber optic cable may be installed.

Referring to FIG. 10, there is illustrated a modified combined pig launching and/or receiving fitting, generally designated by the numeral 182. The fitting 182 is provided with suitable opposed flanges 184 and 186 for connecting the fitting interposed in a pipeline section, such as the pipeline 11, at a suitable point wherein the line has been severed. The launcher-receiver fitting 182 has a lateral or side branch conduit portion 188 intersecting a main conduit section 190. The side branch conduit 188 is provided with a suitable bulkhead or end wall 191 on which a seal assembly 144 is mounted and disposed within a second section 192 of the side branch conduit. The section 192 includes a flange 194 to which a flange 195 may be bolted and adapted to support a second seal assembly 144. A fiber optic cable 196 may thus exit the launcher-receiver fitting 182 and extend through the respective seal assemblies 144. An inspection conduit 193 may be provided which opens into the interior of the conduit 192 and having a suitable closure valve 197 interposed therein for inspecting to determine if the primary or inboard seal assembly might be leaking in service.

The launcher-receiver fitting 182 is also preferably provided with branch conduit portions 183 and 185 each having suitable valves interposed therein for controlling the flow of fluids into and out of the launcher-receiver fitting during pig launching and receiving operations, respectively, for installing a fiber optic cable.

Although preferred embodiments of a method and system, respectively, for installing fiber optic cables in fluid transmission pipelines have been described herein, those skilled in the art will recognize that various substitutions and modifications may be made to the specific embodiments disclosed without departing from the scope and spirit of the invention as recited in the appended claims.

What we claim is:

1. A method for installing an elongated flexible cable in a section of fluid transmission pipeline comprising the steps of:
   providing launching means for launching a pipeline pig at one end of a section of said pipeline, said launching means including a launching fitting including cable seal means and means for introducing pressure fluid into the interior of said section of pipeline behind a pipeline pig for urging said pig to traverse through said section of pipeline;
   providing receiving means for receiving said pig at a receiving end of said section of pipeline opposite the end to which said launching means is connected, said receiving means including conduit means for conducting fluid out of said section of pipeline as said pig traverses said section of pipeline from one end to the other;
   installing a pipeline pig in said section of pipeline at said launching means;
   connecting one end of said cable to said pig and extending said cable through said seal means;
   pumping pressure fluid into said section of pipeline behind said pig to cause said pig to traverse said section of pipeline while towing said cable through said section of pipeline and through said seal means;
   removing fluid from said section of pipeline through said conduit means while traversing said pig toward said receiving means;
   arresting the movement of said pig through said section of pipeline when it has reached said receiving means;
   disconnecting said end of said cable from said pig; and
   extending said end of said cable from said section of pipeline.

2. The method set forth in claim 1 including the step of:
   providing cable seal means for said section of pipeline at said receiving end, said cable seal means including a conduit portion extending laterally away from said section of pipeline and a cable seal for engaging said cable to form a fluid tight seal at a point of exit of said cable from said section of pipeline; and
   extending said end of said cable through said cable seal means at said receiving end in such a way that said cable extends along and adjacent to the wall of said section of pipeline within said section of pipeline to permit traversal of pipeline pigs therethrough.

3. The method set forth in claim 1 including the steps of:
   removing said launching means and said receiving means from said section of pipeline;
   providing cable seal means for each end of said section of pipeline, said cable seal means including a conduit portion extending laterally away from said section of pipeline and a cable seal for engaging said cable to form a fluid tight seal at a point of exit of said cable from said section of pipeline;
   installing said cable seal means on said section of pipeline at opposite ends thereof;
   extending said cable through said cable seal means in such a way that said cable extends along and adjacent to the wall of said section of pipeline within said section of pipeline to permit traversal of pipeline pigs therethrough, and terminating said cable at cable connection means.

4. A system for installing a fiber optic cable in the interior of a fluid transmission pipeline wherein a predetermined length of said cable is installed in a section of said pipeline, said system comprising:
   a launching fitting for attachment to one end of said section of pipeline for launching a pipeline pig into said section of pipeline, said launching fitting including a relatively short section of cylindrical pipe of a diameter substantially the same as the diameter of said section of pipeline, a launch closure for said launching fitting to provide for installing a pig in said launching fitting and for closing one end of said launching fitting after installation of said pig, and conduit means in communication with the interior of said section of cylindrical pipe for pumping pressure fluid into said launching fitting for traversing said pig through said section of pipeline;
   a cable seal fitting adapted to be connected to said launching fitting for receiving a length of fiber optic cable to be connected to said pig at one end of said cable, said cable seal fitting including seal means engageable with said cable to prevent leakage of pressure fluid from said launching fitting to the environment surrounding said section of pipeline;

a receiving fitting adapted to be connected to said section of pipeline at the end of said section of pipeline opposite said end connected to said launching fitting, a receiver closure for said receiving fitting for closing said receiving fitting during traversal of said pig through said section of pipeline, said receiver closure being removable to permit extraction of said pig from said receiving fitting when said pig arrives at said receiving fitting, and said receiving fitting including fluid conduit means connected thereto for receiving fluid displaced from said section of pipeline during traversal of said pig therethrough.

5. The system set forth in claim 4 wherein:

said conduit means connected to said receiving fitting includes a first conduit connected to said receiving fitting and a second conduit connected to said receiving fitting at a point spaced from said first conduit for relieving fluid pressure in said receiving fitting when said pig has passed into said receiving fitting and beyond the point of connection of said first conduit to said receiving fitting.

6. The system set forth in claim 4 including:

pig restraining means associated with said receiving fitting and adapted to permit movement of said pig into said receiving fitting in one direction and to restrain movement of said pig through said receiving fitting and into said section of pipeline in the opposite direction.

7. The system set forth in claim 6 wherein:

said restraining means comprises generally wedge shaped restraining lugs disposed in a cylindrical section of pipe comprising at least a portion of said receiving fitting and engageable with resilient cup means on said pig to prevent movement of said pig in said opposite direction.

8. The system set forth in claim 4 wherein:

said cable seal fitting includes at least one resilient seal means engageable with said cable and responsive to the urging of pressure fluid in said section of pipeline to forcibly engage the outer surface of said cable to form a fluid tight seal between said seal means and said cable.

9. The system set forth in claim 8 wherein:

said seal means includes a seal member having a hub shaped portion and an inner lip defining a bore for receiving said cable, the surface of said hub portion being adapted to be exposed to pressure fluid in said section of pipeline to urge said lip radially inwardly into forcible engagement with said cable.

10. The system set forth in claim 9 wherein:

said cable seal fitting includes a generally cylindrical tube member, a first seal member disposed at one end of said tube member and forming a primary seal, and a second seal member spaced apart from said first seal member and toward the opposite end of said tube member and forming a secondary seal.

11. In a fluid transmission pipeline having a signal transmitting cable extending through said pipeline over at least a first predetermined section of said pipeline and wherein said cable enters said section of pipeline at a first point and exits said section of pipeline at a second point, a cable seal fitting forming a part of said section of pipeline and including cable seal means for forming a fluid tight seal around said cable at least at one of said exit and entry points, said seal means comprising;

a stuffing box including a longitudinal bore for receiving said cable, said stuffing box including opposed sections which are adapted to be releasably connected to each other to form said bore and to form a cavity for receiving packing means engageable with said cable and a packing gland adapted to be secured to said stuffing box and extending at least partially into said cavity for forcibly retaining said packing means in engagement with said cable, said packing gland including opposed sections adapted to be secured in assembly with each other to form a bore for receiving said cable and for engagement with said packing means, said packing gland and said stuffing box being removable from said seal fitting and said cable without extending an end of said cable through said stuffing box or said packing gland.

* * * * *